US009394969B2

(12) United States Patent
Hampel et al.

(10) Patent No.: US 9,394,969 B2
(45) Date of Patent: Jul. 19, 2016

(54) HAND-HELD TOOL GEAR MECHANISM UNIT

(71) Applicant: Robert Bosch GmbH, Stuttgart (DE)

(72) Inventors: Thomas Hampel, Magstadt (DE); Juergen Gairing, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 14/075,253

(22) Filed: Nov. 8, 2013

(65) Prior Publication Data

US 2014/0130627 A1    May 15, 2014

(30) Foreign Application Priority Data

Nov. 9, 2012   (DE) .................. 10 2012 220 415

(51) Int. Cl.
*F16H 1/14* (2006.01)
*B25F 5/00* (2006.01)

(52) U.S. Cl.
CPC ........ *F16H 1/14* (2013.01); *B25F 5/001* (2013.01); *Y10T 74/19502* (2015.01); *Y10T 74/19521* (2015.01)

(58) Field of Classification Search
CPC .................................. F16H 1/14; B23B 45/00
USPC ............. 173/213, 216; 74/385, 380, 417, 133
See application file for complete search history.

(56) References Cited

U.S. PATENT DOCUMENTS

| 2,106,937 | A | * | 2/1938 | Torbert, Jr. ................ 408/127 |
| 2,235,427 | A | * | 3/1941 | Harris ........................ 74/385 |
| 2,348,266 | A | * | 5/1944 | Selby ......................... 74/417 |
| 2,414,637 | A | * | 1/1947 | Crump ...................... 173/213 |
| 3,922,930 | A | * | 12/1975 | Fletcher et al. ........... 74/665 B |
| 4,358,243 | A | * | 11/1982 | Heath ....................... 416/11 |
| 4,662,814 | A | * | 5/1987 | Suzuki et al. ............ 414/730 |
| 4,662,815 | A | * | 5/1987 | Zimmer .................... 414/735 |
| 5,533,581 | A | * | 7/1996 | Barth et al. ............... 173/216 |
| 8,448,535 | B2 | * | 5/2013 | Wang ......................... 74/417 |
| 2002/0029647 | A1 | * | 3/2002 | Brooks ............... B60K 17/04 74/424 |
| 2008/0289843 | A1 | * | 11/2008 | Townsan .............. B25B 21/00 173/216 |
| 2012/0079904 | A1 | * | 4/2012 | Teng et al. ................ 74/380 |

* cited by examiner

*Primary Examiner* — Nathaniel Chukwurah
(74) *Attorney, Agent, or Firm* — Maginot, Moore & Beck LLP

(57) ABSTRACT

A hand-held tool gear mechanism unit includes a drive gearwheel, an output gearwheel, and a connecting unit. The output gearwheel has a rotational axis spaced apart radially from a rotational axis of the drive gearwheel. The connecting unit is configured to transmit a rotational movement from the drive gearwheel to the output gearwheel substantially without a step-up transmission ratio. The connecting unit is configured to couple the drive gearwheel and the output gearwheel such that they can be moved relative to one another about a pivot axis.

13 Claims, 3 Drawing Sheets

HAND-HELD TOOL GEAR MECHANISM UNIT

This application claims priority under 35 U.S.C. §119 to patent application no. DE 10 2012 220 415.6, filed on Nov. 9, 2012 in Germany, the disclosure of which is incorporated herein by reference in its entirety.

BACKGROUND

A hand-held tool gear mechanism unit has already been proposed having a drive gearwheel, having an output gearwheel which has a rotational axis which is spaced apart radially from a rotational axis of the drive gearwheel, and having a connecting unit which transmits a rotational movement from the drive gearwheel to the output gearwheel substantially without a step-up transmission ratio.

SUMMARY

The disclosure proceeds from a hand-held tool gear mechanism unit having a drive gearwheel, having an output gearwheel which has a rotational axis which is spaced apart radially from a rotational axis of the drive gearwheel, and having a connecting unit which transmits a rotational movement from the drive gearwheel to the output gearwheel substantially without a step-up transmission ratio.

It is proposed that the connecting unit is provided for coupling the drive gearwheel and the output gearwheel such that they can be moved relative to one another about a pivot axis. A "drive gearwheel" is to be understood to mean, in particular, a gearwheel which is arranged in terms of action, in particular, directly in front of the connecting unit. The drive gearwheel is preferably arranged in terms of action between a gear mechanism of a drive unit of a hand-held tool and the connecting unit. In at least one operating state, the gear mechanism of the drive unit reduces a rotational speed of a motor of the drive unit. An "output gearwheel" is to be understood to mean, in particular, a gearwheel which is arranged in terms of action, in particular, directly behind the connecting unit. The output gearwheel is preferably arranged in terms of action between the connecting unit and an insertable tool fastening means of the hand-held tool gear mechanism unit. The output gearwheel is advantageously connected fixedly to the insertable tool fastening means so as to rotate with it. "Spaced apart radially" is to be understood to mean, in particular, that the rotational axis of the drive gearwheel and the rotational axis of the output gearwheel are at a spacing in a direction perpendicularly with respect to at least one of the rotational axes. The rotational axis of the drive gearwheel and the rotational axis of the output gearwheel are preferably at a spacing of greater than 2 mm, advantageously greater than 4 mm, particularly advantageously greater than 8 mm, along a rotational axis of the connecting unit. The rotational axis of the drive gearwheel and the rotational axis of the output gearwheel are preferably at a spacing of less than 40 mm, advantageously less than 30 mm, particularly advantageously less than 20 mm, along the rotational axis of the connecting unit. The rotational axis of the drive gearwheel and the rotational axis of the output gearwheel can preferably be oriented in parallel. A "connecting unit" is to be understood to mean, in particular, a unit which connects the drive gearwheel and the output gearwheel directly in terms of action. All the parts of the connecting unit are preferably connected fixedly to one another so as to rotate together. As an alternative, the connecting unit could have two or, in particular, three gearwheels which are in engagement with one another. In this context, "transmit a rotational movement" is to be understood to mean, in particular, that, during operation, the drive gearwheel drives the connecting unit and the connecting unit drives the output gearwheel. The phrase "substantially without a step-up transmission ratio" is to be understood to mean, in particular, that at least one transmission ratio between the drive gearwheel and the output gearwheel is between 10 and 1, advantageously between 5 and 1, particularly advantageously between 2 and 1. The drive gearwheel and the output gearwheel preferably have an identical rotational speed during operation. The drive gearwheel and the output gearwheel preferably have an identical rotational direction during operation, that is to say they rotate in an identical direction in relation to the direction in terms of action. "Provided" is to be understood to mean, in particular, configured and/or equipped specifically. The phrase "couple such that they can be moved relative to one another about a pivot axis" is to be understood to mean, in particular, that the connecting unit makes pivoting of the rotational axis of the output gearwheel relative to the rotational axis of the drive gearwheel possible, the connecting unit being provided for transmitting the rotational movement from the drive gearwheel to the output gearwheel in various positions of the rotational axis of the output gearwheel relative to the rotational axis of the drive gearwheel. The connecting unit is preferably provided for coupling the drive gearwheel and the output gearwheel in at least two, advantageously at least three different pivoting positions. The connecting unit is particularly advantageously provided for coupling the drive gearwheel and the output gearwheel over a pivoting range of at least 60°, advantageously at least 120°, particularly advantageously at least 180°. As a result of the embodiment according to the disclosure of the hand-held tool gear mechanism unit, it is possible to work at locations which are close to the edge and can be reached only with particular difficulty, because a rotational axis of the insertable tool is arranged close to a pivot housing face which runs parallel to said rotational axis and the rotational axis can be pivoted relative to a main extent of the hand-held tool. As a result of the embodiment according to the disclosure of the hand-held tool gear mechanism unit, working close to the edge is no longer restricted by a diameter of a drive unit, in particular a gear mechanism of the drive unit, of the hand-held tool.

It is proposed in another embodiment that the pivot axis is oriented perpendicularly with respect to the rotational axis of the drive gearwheel, as a result of which a structurally simple pivoting mechanism can be used. "Oriented perpendicularly" is to be understood to mean, in particular, that the pivot axis is oriented parallel to a plane which has a 90° angle with respect to the rotational axis of the drive gearwheel. The pivot axis preferably intersects the rotational axis of the drive gearwheel at a right angle. The pivot axis advantageously intersects the rotational angle of the output gearwheel at a right angle.

Furthermore, it is proposed that the connecting unit has at least one gearwheel which is configured as a bevel gearwheel, as a result of which an efficient transmission of the torque can be achieved in a structurally simple manner. A "bevel gearwheel" is to be understood to mean a gearwheel which has a basic shape of a truncated cone and the circumferential face of which is toothed.

Furthermore, it is proposed that the connecting unit has two gearwheels which are arranged separately from one another, as a result of which the rotational axis of the drive gearwheel can be spaced apart from the rotational axis of the output gearwheel in a structurally simple manner. The phrase "have two gearwheels which are arranged separately from one another" is to be understood to mean, in particular, that the connecting unit has a first gearwheel which meshes with the drive gearwheel and a second gearwheel which is different from the first gearwheel and meshes with the output gearwheel.

In addition, it is proposed that the gearwheels of the connecting unit are arranged between the rotational axis of the drive gearwheel and the rotational axis of the output gearwheel, as a result of which a construction is possible which is particularly stable and subject to low wear. In this context, "between" is to be understood to mean, in particular, that the connecting unit lies on a straight line which intersects the rotational axis of the drive gearwheel and the rotational axis of the output gearwheel, in particular, at a right angle. As an alternative, merely that gearwheel of the connecting unit which meshes with the output gearwheel could be arranged between the rotational axis of the drive gearwheel and the rotational axis of the output gearwheel. The gearwheel which meshes with the drive gearwheel is preferably arranged on a side of the rotational axis of the drive gearwheel, which side faces away from the rotational axis of the output gearwheel.

Furthermore, it is proposed that the hand-held tool gear mechanism unit comprises a bearing apparatus which mounts a shaft of the connecting unit at two points, between which at least one of the gearwheels of the connecting unit is arranged, as a result of which a construction can be achieved which is particularly stable and subject to low wear. A "bearing apparatus" is to be understood to mean, in particular, an apparatus which is provided for bringing about at least one bearing force on the shaft of the connecting unit, which bearing force fastens the shaft rotatably. A "shaft of the connecting unit" is to be understood to mean, in particular, a shaft which connects the gearwheels of the connecting unit fixedly to one another so as to rotate together. The phrase "at two points" is to be understood to mean, in particular, that the bearing apparatus has two bearing means which act on the shaft of the connecting unit at different points.

It is proposed in one advantageous embodiment of the disclosure that the hand-held tool gear mechanism unit has a drive shaft which is configured at least partially integrally with the drive gearwheel, as a result of which low production costs are possible. A "drive shaft" is to be understood to mean, in particular, a shaft which transmits the rotational movement from the direction of the drive unit of the hand-held tool to the drive gearwheel. "Configured at least partially integrally" is to be understood to mean, in particular, that the drive shaft and the drive gearwheel are connected to one another in a material-to-material manner, such as by way of a welding process, an adhesive bonding process and/or advantageously by way of being machined out of a single blank. The drive gearwheel is preferably cut onto the drive shaft.

It is proposed in a further embodiment that the hand-held tool gear mechanism unit has an output shaft which is configured at least partially integrally with the output gearwheel, as a result of which low production costs can be achieved. An "output shaft" is to be understood to mean, in particular, a shaft which, during operation, transmits a rotational movement away from the output gearwheel in the direction of the insertable tool fastening means.

Furthermore, it is proposed that the hand-held tool gear mechanism unit has a coupling apparatus which is provided for producing a connection to a hand-held tool, which connection can be disconnected by an operator, as a result of which the hand-held tool can be used in an optimum manner in different working situations. A "coupling apparatus" is to be understood to mean, in particular, an apparatus which is provided for fastening a pivoting housing of the hand-held tool gear mechanism unit to the hand-held tool in a non-positive and/or positively locking manner. The coupling apparatus preferably locks the pivoting housing of the hand-held tool gear mechanism unit to the hand-held tool. The phrase "can be disconnected by an operator" is to be understood to mean, in particular, that the connection is configured such that it can be released by the operator without destruction. The coupling apparatus is advantageously provided for producing a connection to a hand-held tool, which connection can be disconnected without tools. A "hand-held tool" is to be understood to mean a hand-held tool which appears appropriate to a person skilled in the art, but advantageously a power drill, a hammer and/or percussion drill or particularly advantageously a screwdriver.

Furthermore, it is proposed that the hand-held tool gear mechanism unit comprises an articulation closure which is provided for closing a pivoting region at least partially, as a result of which penetration of dirt and moisture into the pivoting housing of the hand-held tool gear mechanism unit can be reduced advantageously. A "pivoting region" is to be understood to mean, in particular, a region, through which at least the output shaft, the drive shaft, the insertable tool fastening means and/or an insertable tool which is fastened in the insertable tool fastening means emerges from a pivoting housing of the hand-held tool gear mechanism unit in at least one of a plurality of possible positions around the pivot axis. The phrase "close at least partially" is to be understood to mean, in particular, that the articulation closure covers more than 50%, advantageously more than 75%, particularly advantageously more than 90% of the part of the pivoting region which is uncovered by the output shaft and/or the insertable tool fastening means, by the output shaft, the insertable tool fastening means and/or the insertable tool which is fastened in the insertable tool fastening means.

In addition, it is proposed that the articulation closure has at least two sprung closure segments, as a result of which particularly satisfactory protection against penetrating dirt and against penetrating moisture can be achieved. A "closure segment" is to be understood to mean, in particular, a part of the articulation closure which is provided for closing a part of the pivoting region at least partially. The term "sprung" is to be understood to mean, in particular, that the closure segments are mounted such that they can be displaced counter to at least one spring element.

Furthermore, the disclosure proceeds from a hand-held tool having a hand-held tool gear mechanism unit according to the disclosure.

It is proposed that the hand-held tool has a drive unit, the rotational axis of the drive gearwheel and a rotational axis of the drive unit being at least substantially identical. A "drive unit" is to be understood to mean, in particular, a unit which is provided for producing a rotational movement which is suitable for a working operation. The drive unit preferably comprises a motor and a gear mechanism which is provided for converting a rotational movement of a part of the motor into the rotational movement which is suitable for the working operation. The phrase "at least substantially identical" is to be understood to mean, in particular, that the rotational axis of the drive gearwheel and the rotational axis of the drive unit are spaced apart by less than 15 mm, advantageously less than 10 mm, particularly advantageously less than 5 mm, in a volume of the hand-held tool and the hand-held tool gear mechanism unit. The rotational axis of the drive gearwheel and the rotational axis of the drive unit particularly preferably lie on an identical straight line. An advantageous, in particular space-saving construction is possible as a result of the embodiment according to the disclosure of the hand-held tool.

Furthermore, it is proposed that the machine housing has an overall length of less than 180 mm, as a result of which a hand-held tool can be provided which can be used in particularly constricted working locations. A "machine housing" is to be understood to mean, in particular, a housing which encloses modules of the hand-held tool in a protected manner and connects them to one another. The hand-held tool, in particular together with a hand-held tool gear mechanism unit which is coupled to the hand-held tool, preferably has an overall length of less than 180 mm parallel to a rotational axis of the insertable tool fastening means.

Here, the hand-held tool gear mechanism unit according to the disclosure and the hand-held tool according to the disclosure are not to be restricted to the above-described application and embodiment. In particular, the hand-held tool gear mechanism unit according to the disclosure and the hand-held tool according to the disclosure can have a number which differs from a number mentioned herein of individual elements, components and units for fulfilling a method of operation which is described herein.

BRIEF DESCRIPTION OF THE DRAWINGS

Further advantages result from the following description of the drawing. Three exemplary embodiments of the disclosure are shown in the drawing. The drawing, the description and the claims contain numerous features in combination. A person skilled in the art will expediently also consider the features individually and combine them to form appropriate further combinations.

In the drawing.

DETAILED DESCRIPTION

Figure 1:
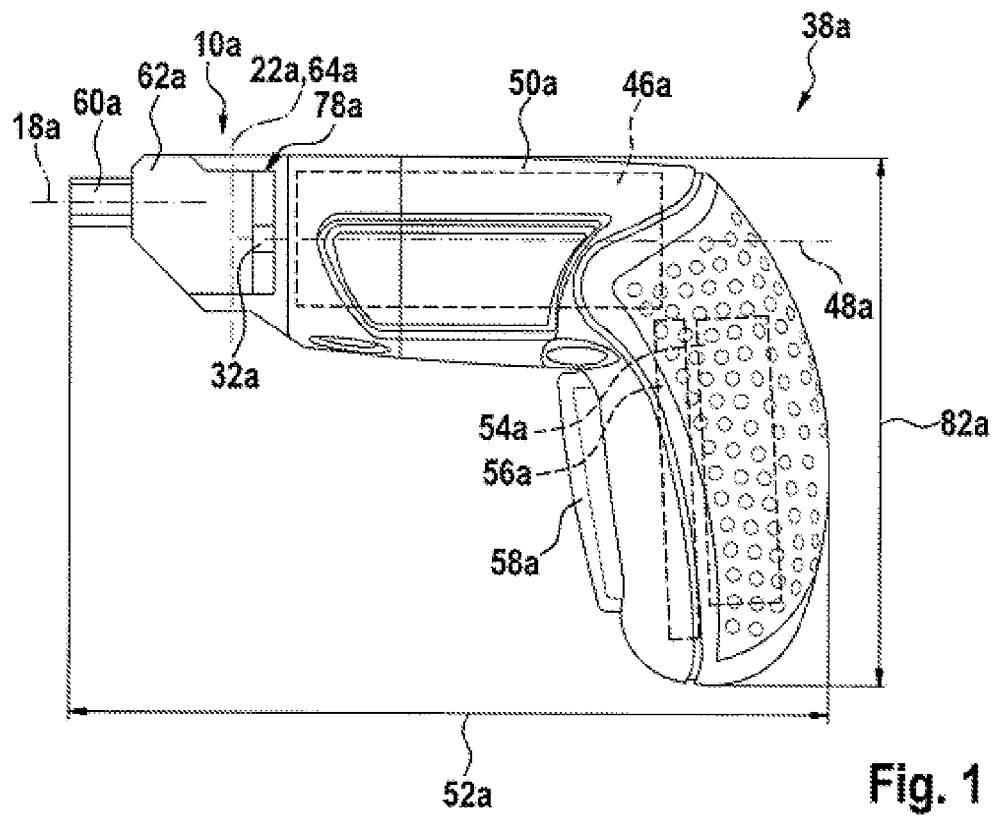
FIG. 1 shows a hand-held tool having a hand-held tool gear mechanism unit according to the disclosure in a side view.

FIG. 1 shows a hand-held tool 38a which is configured as a screwdriver. The hand-held tool 38a comprises a hand-held tool gear mechanism unit 10a according to the disclosure, a drive unit 46a, a pistol-shaped machine housing 50a, a rechargeable battery 54a, electronics 56a and an operating element 58a. The hand-held tool gear mechanism unit 10a is connected fixedly to the hand-held tool 38a, but could also be connected such that it can be disconnected by an operator. The diagrammatically shown drive unit 46a comprises, in a manner which is not shown in greater detail here, an electric motor and a gear mechanism which reduces a rotational movement of the electric motor during a working operation to a rotational speed which is suitable for screwing and provides counterclockwise rotation and clockwise rotation. The electronics 56 supply the electric motor with electric power from the rechargeable battery 54 in a manner which is dependent on an operator input via the operating element 58.

The hand-held tool gear mechanism unit 10a comprises a drive gearwheel 12a, an output gearwheel 14a, a connecting unit 20a, a bearing apparatus 28a, a drive shaft 32a, an output shaft 34a, an insertable tool fastening means 60a and a pivoting housing 62a. The pivoting housing 62a is configured as at least one plastic part. Here, the pivoting housing 62a consists of two housing shells which are connected in a material-to-material manner.

The drive shaft 32a is connected fixedly to a part of the drive unit 46a and the drive gearwheel 12a so as to rotate with them. During operation, the drive unit 46a drives the gearwheel 12a and the drive shaft 32a rotationally about a rotational axis 16a of the drive gearwheel 12a. The rotational axis 16a of the drive gearwheel 12a cannot be moved relative to the machine housing 50a. In a manner which is not shown in greater detail here, the drive shaft 32a is mounted in the machine housing 50a such that it can be rotated about the rotational axis 16a. The drive gearwheel 12a is configured as a bevel gearwheel. It is configured integrally with the drive shaft 32a. As an alternative, a drive gearwheel could be pressed and/or fastened in a positively locking manner onto a drive shaft.

The drive gearwheel 12a meshes with a first gearwheel 24a of the connecting unit 20a. The first gearwheel 24a is configured as a bevel gearwheel. A shaft 30a of the connecting unit 20a connects the first gearwheel 24a to a second gearwheel 26a of the connecting unit 20a. A rotational axis 64a of the connecting unit 20a is oriented perpendicularly with respect to the rotational axis 16a of the drive gearwheel 12a. The second gearwheel 26a of the connecting unit 20a is configured as a bevel gearwheel. The two gearwheels 24a, 26a of the connecting unit 20a are arranged separately from one another. The second gearwheel 26a of the connecting unit 20a meshes with the output gearwheel 14a.

A rotational axis 18 of the output gearwheel 14a is oriented perpendicularly with respect to the rotational axis 64a of the connecting unit 20a. The rotational axis 16a of the drive gearwheel 12a is arranged such that it is spaced apart radially from the rotational axis 18a of the output gearwheel 14a by approximately 18 mm. The connecting unit 20a is therefore provided for coupling the drive gearwheel 12a and the output gearwheel 14a such that they can be moved relative to one another about a pivot axis 22a. The gearwheels 24a, 26a of the connecting unit 20a are arranged between the rotational axis 16a of the drive gearwheel 12a and the rotational axis 18a of the output gearwheel 14a.

The drive gearwheel 12a and the output gearwheel 14a have an identical number of teeth. The two gearwheels 24a, 26a of the connecting unit 20a have an identical number of teeth. The connecting unit 20a therefore transmits a rotational movement from the drive gearwheel 12a to the output gearwheel 14a without a step-up transmission ratio.

The output shaft 34a is configured integrally with the output gearwheel 14a. The output shaft 34a is mounted in the pivoting housing 62a of the hand-held tool gear mechanism unit 10a by way of a bearing means 74a of the hand-held tool gear mechanism unit 10a such that it can be rotated about the rotational axis 18a. The output shaft 34a connects the output gearwheel 14a fixedly to the insertable tool fastening means 60a of the hand-held tool gear mechanism unit 10a so as to rotate with it. The insertable tool fastening means 60a is provided as a bit holder. To this end, the insertable tool fastening means 60a delimits an insertable tool receiving space 76a by way of a hexagonal base face.

The bearing apparatus 28a mounts the pivoting housing 62a of the hand-held tool gear mechanism unit 10a such that it can be pivoted relative to the machine housing 50a. To this end, the bearing apparatus 28a has a first bearing means 66a and a second bearing means 68a which mount the connecting unit 20a rotatably in the machine housing 50a. The first gearwheel 24a and the second gearwheel 26a of the connecting unit 20a are arranged between the first bearing means 66a and the second bearing means 68a. The bearing apparatus 28a therefore mounts the shaft 30a of the connecting unit 20a at two points, between which the two gearwheels 24a, 26a of the connecting unit 20a are arranged.

The bearing apparatus 28a has a third bearing means 70a and a fourth bearing means 72a which mount the pivoting housing 62a of the hand-held tool gear mechanism unit 10a on the shaft 30a of the connecting unit 20a such that it can be pivoted relative to the machine housing 50a. The first gearwheel 24a and the second gearwheel 26a of the connecting unit 20a are arranged between the third bearing means 70a and the fourth bearing means 72a. As an alternative, a fourth bearing means which is arranged so as to lie closer to a drive gearwheel than a third bearing means could be arranged between two gearwheels of a connecting unit. The pivot axis 22a and the rotational axis 64a of the connecting unit 20a therefore lie on an identical line. The pivot axis 22a of the pivoting housing 62a is oriented perpendicularly with respect to the rotational axis 16a of the drive gearwheel 12a. The machine housing 50a has a pivoting cutout 78a which makes pivoting of the pivoting housing 62a possible about a pivoting angle of approximately 180°.

The output gearwheel 14a has a maximum diameter 84a which is at most twice as large as a maximum diameter 86a of the output shaft 34a. Here, the output gearwheel 14a and the output shaft 34 have an identical diameter 84a, 86a, and, to be precise, the output gearwheel 14a has a maximum diameter 84a of less than 15 mm, namely of approximately 8 mm. The insertable tool fastening means 60a has a maximum diameter 87a which is at most twice as large as a maximum diameter 86a of the output shaft 34a, and, to be precise, the insertable tool fastening means 60a has a diameter 87a of less than 16 mm, namely of approximately 12 mm. The maximum diameter 84a of the output gearwheel 14a and the maximum diameter 87a of the insertable tool fastening means 60a differ by less than 50% of the maximum diameter 84a of the output gearwheel 14a. The machine housing 50a has an overall length 52a of less than 180 mm, namely of approximately 115 mm. In addition, the machine housing 50a has an overall height 82a perpendicularly with respect to the total length 52a of less than 200 mm, namely of approximately 140 mm. A rotational axis 16a of the drive gearwheel 12a and a rotational axis 48a of the drive unit 46a are identical, that is to say they lie on an identical line.

Figure 2:
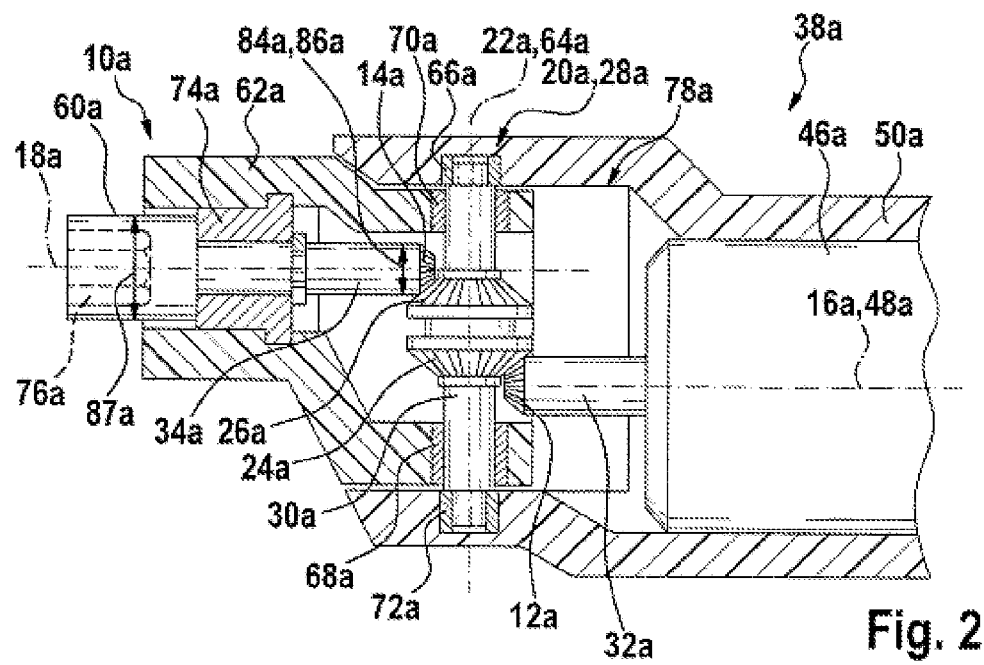
FIG. 2 shows the hand-held tool gear mechanism unit from FIG. 1 in a sectional illustration.

FIGS. 3 to 6 show two further exemplary embodiments of the disclosure. The following descriptions and the drawings are restricted substantially to the differences between the exemplary embodiments, it being possible in principle for reference also to be made to the drawings and/or the description of the other exemplary embodiments, in particular FIGS. 1 and 2, with regard to components with an identical designation, in particular in relation to components with identical reference numerals. In order to distinguish between the exemplary embodiments, the letter a is placed after the reference numerals of the exemplary embodiment in FIGS. 1 and 2. The letter a is replaced by the letters b or c in the exemplary embodiments of FIGS. 3 to 6.

Figure 3:
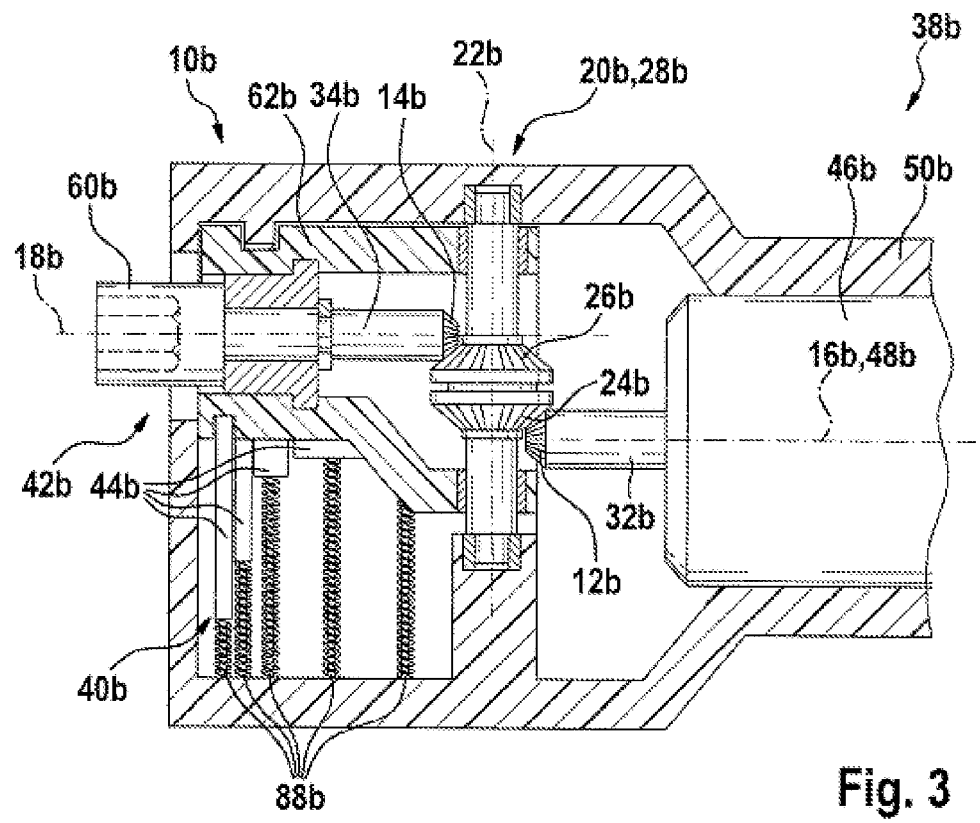
FIG. 3 shows a sectional illustration of an alternative exemplary embodiment of the hand-held tool gear mechanism unit from FIG. 1 having an articulation closure which comprises sprung closures segments.

FIG. 3 shows a part of a hand-held tool 38b having a hand-held tool gear mechanism unit 10b. The hand-held tool gear mechanism unit 10b comprises at least one drive gearwheel 12b, an output gearwheel 14b, a connecting unit 20b and a pivoting housing 62b. A rotational axis 16b of the drive gearwheel 12b is spaced apart radially from a rotational axis 18b of the output gearwheel 14b by approximately 18 mm. During operation, the connecting unit 20b transmits a rotational movement from the drive gearwheel 12b to the output gearwheel 14b without a step-up transmission ratio. The connecting unit 20b is provided for coupling the drive gearwheel 12b and the output gearwheel 14b such that they can be moved relative to one another about a pivot axis 22b.

Figure 4:
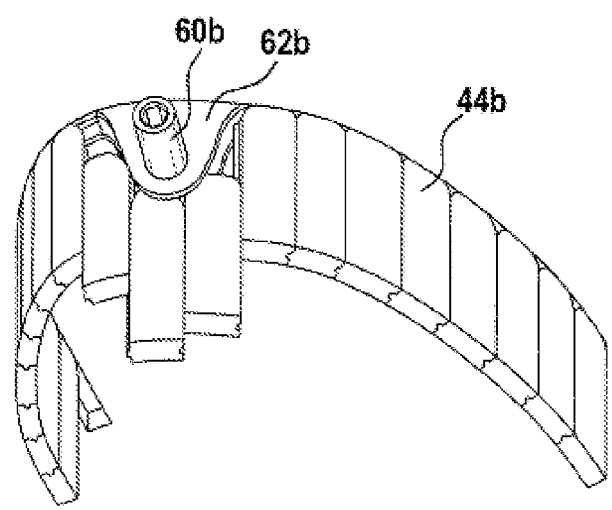
FIG. 4 shows the articulation closure of the hand-held tool gear mechanism unit from FIG. 3 in a perspective illustration.

FIG. 4 shows an articulation closure 40b of the hand-held tool gear mechanism unit 10b. The articulation closure 40b of the hand-held tool gear mechanism unit 10b is provided for closing a pivoting region 42b at least partially. The output shaft 34b and the pivoting housing 62b extend through the pivoting region 42b. The pivoting region 42b is arranged on a side of the pivoting housing 62b, which side faces an insertable tool fastening means 60b of the hand-held tool gear mechanism unit 10b. The articulation closure 40b comprises a row of sprung closure segments 44b which are displaced during a movement of the pivoting housing 62b, as a result of which the pivoting region 42b is covered. To this end, the closure segments 44b are pressed by springs 88b in the direction of the pivoting housing 62b. The closure segments 44b are of rounded configuration on a side which faces away from the springs 88b. The closure segments 44b are guided on two sides which lie in the movement direction, as a result of which the risk that the closure segments 44b are pressed inward can be minimized advantageously.

Figure 5:
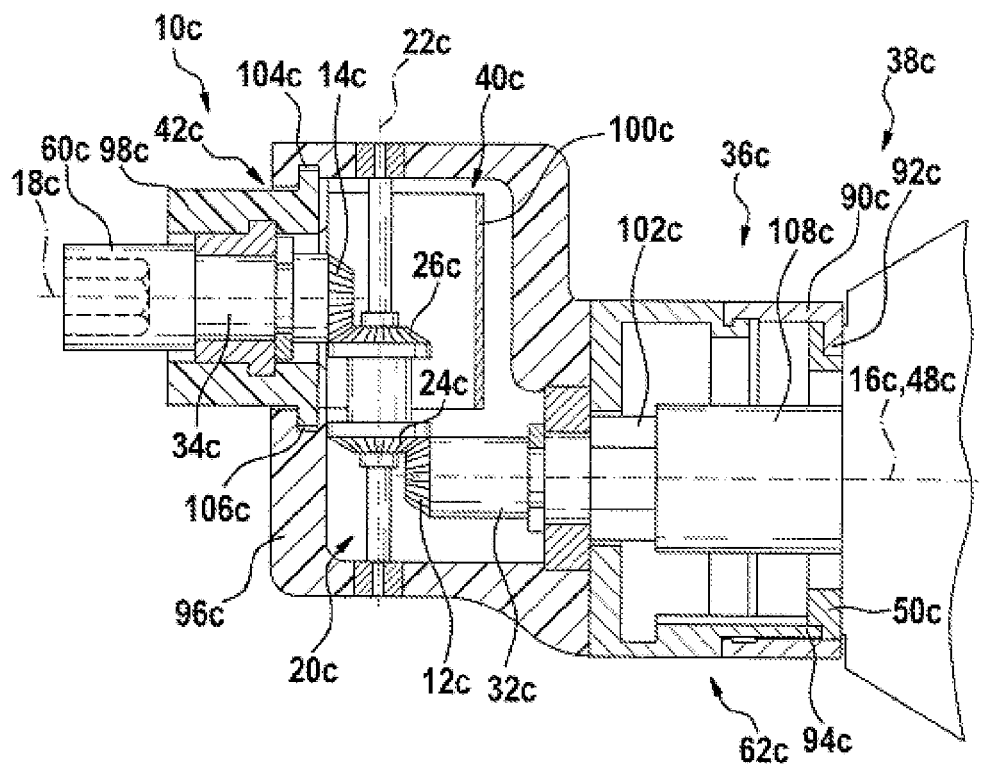
FIG. 5 shows a sectional illustration of an alternative exemplary embodiment of the hand-held tool gear mechanism unit from FIG. 1 having an articulation closure which comprises a closure belt.
Figure 6:
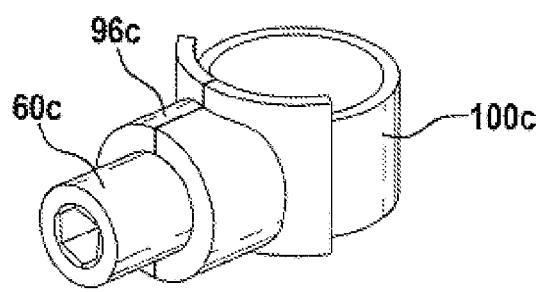
FIG. 6 shows the articulation closure of the hand-held tool gear mechanism unit from FIG. 5 in a perspective illustration.

FIG. 5 shows a system having a partially illustrated hand-held tool 38c and a hand-held tool gear mechanism unit 10c. The hand-held tool gear mechanism unit 10c comprises at least one drive gearwheel 12c, an output gearwheel 14c, a connecting unit 20c, an articulation closure 40c, an insertable tool fastening means 60c and a pivoting housing 62c. A rotational axis 16c of the drive gearwheel 12c is spaced apart radially from a rotational axis 18c of the output gearwheel 14c by approximately 18 mm. During operation, the connecting unit 20c transmits a rotational movement from the drive gearwheel 12c to the output gearwheel 14c without a step-up transmission ratio. The connecting unit 20c is provided for coupling the drive gearwheel 12c and the output gearwheel 14c such that they can be moved relative to one another about a pivot axis 22c.

The hand-held tool gear mechanism unit 10c has a coupling apparatus 36c which is provided for producing a connection to a hand-held tool 38c, which connection can be disconnected by an operator. The coupling apparatus 36c comprises an operating element 90c, a fastening means 92c and a fixing means 94c. The operating element 90c is of annular configuration and is mounted rotatably on the pivoting housing 62c. The fastening means 92c is provided for producing a positively locking connection with an undercut of the hand-held tool 38c during a rotation of the operating element 90c. The fixing means 94c is provided for coupling the pivoting housing 62c in an axially fixed manner to the hand-held tool 38c so as to rotate with it in the case of an established positively locking connection. In addition, in a manner which is not shown in greater detail here, the operating element 90c is sprung, as a result of which accidental release is avoided. The coupling apparatus 36c is provided for coupling with the hand-held tool 38c in different orientations relative to the hand-held tool 38c, as a result of which the pivot axis 22c can be oriented differently with respect to the hand-held tool 38c.

The pivoting housing 62c is configured in two parts. A first part 96c of the pivoting housing 62c is fixed relative to the hand-held tool 38c during a working operation. A second part 98c (shown in FIG. 6) of the pivoting housing 62c is mounted such that it can be pivoted relative to the hand-held tool 38c. The first part 96c of the pivoting housing 62c has two guide grooves 104c, 106c which mount the part 98c of the pivoting housing 62c pivotably. Here, the second part 98c can be pivoted by more than 180° relative to the first part 96c.

The articulation closure 40c is provided for closing two laterally arranged pivoting regions 42c. To this end, the articulation closure 40c comprises an annular belt 100c which keeps the pivoting regions 42c closed, in particular completely, during pivoting of the pivoting housing 62c. The connecting unit 20c is guided into the annular belt 100c from a side which faces the drive gearwheel 12c. The output gearwheel 14c is arranged within the annular belt 100c. A drive shaft 32c of the hand-held tool gear mechanism unit 10c is connected fixedly to a drive means 102c so as to rotate with it, which drive means 102c is driven directly by the hand-held tool 38c during operation. The drive means 102c is of hexagonal configuration. It can therefore be driven by an insertable tool fastening means 108c of the hand-held tool 38c.

What is claimed is:

1. A hand-held tool gear mechanism unit, comprising:
   a drive gearwheel having a first rotational axis;
   an output gearwheel having a second rotational axis spaced apart radially from the first rotational axis;
   a connecting unit configured to transmit a rotational movement from the drive gearwheel to the output gearwheel substantially without a step-up transmission ratio, the connecting unit coupling the drive gearwheel and the output gearwheel in such a way that the drive gearwheel and the output gearwheel are pivotable relative to one another about a pivot axis;
   a pivoting housing including (i) a first part fixed relative to the first rotational axis and defining a pivoting opening through which the second rotational axis extends and (ii) a second part extending around the second rotational axis, projecting through the pivoting opening, and configured to pivot about the pivot axis with the output gearwheel; and
   an output shaft configured at least partially integrally with the output gearwheel, the output shaft extending into the second part,
   wherein the second part includes an articulation closure configured to cover more than 90% of a region of the pivoting opening that is uncovered by the output shaft.

2. A hand-held tool gear mechanism unit, comprising:
   a drive gearwheel having a first rotational axis;
   an output gearwheel having a second rotational axis spaced apart radially from the first rotational axis;
   a connecting unit configured to transmit a rotational movement from the drive gearwheel to the output gearwheel substantially without a step-up transmission ratio, the connecting unit coupling the drive gearwheel and the output gearwheel in such a way that the drive gearwheel and the output gearwheel are pivotable relative to one another about a pivot axis; and
   a pivoting housing including (i) a first part fixed relative to the first rotational axis and defining a pivoting opening through which the second rotational axis extends and (ii) a second part extending around the second rotational axis, projecting through the pivoting opening, and configured to pivot about the pivot axis with the output gearwheel,
   wherein the second part includes an annular belt circumferentially surrounding the pivot axis and configured to at least partially close the pivoting opening.

3. The hand-held tool gear mechanism unit according to claim 1, wherein the pivot axis is oriented perpendicularly with respect to the first rotational axis.

4. The hand-held tool gear mechanism unit according to claim 1, wherein the connecting unit has at least one gearwheel configured as a bevel gearwheel.

5. The hand-held tool gear mechanism unit according to claim 1, wherein the connecting unit has two gearwheels arranged separately from one another.

6. The hand-held tool gear mechanism unit according to claim 5, wherein the gearwheels of the connecting unit are arranged between the first rotational axis and the second rotational axis.

7. The hand-held tool gear mechanism unit according to claim 1, further comprising a drive shaft configured at least partially integrally with the drive gearwheel.

8. The hand-held tool gear mechanism unit according to claim 1, further comprising an output shaft configured at least partially integrally with the output gearwheel, the output shaft extending into the second part.

9. The hand-held tool gear mechanism unit according to claim 1, further comprising:
   a coupling apparatus configured to produce a connection between the pivoting housing and a hand-held tool,
   wherein the coupling apparatus is further configured so that the connection is terminable in response to an operator action.

10. The hand-held tool gear mechanism unit according to claim 1, wherein the first part defines guide grooves, and the second part is mounted in the guide grooves so as to be pivotable about the pivot axis.

11. A hand-held tool, comprising:
    a hand-held tool gear mechanism unit, including:
      a drive gearwheel having a first rotational axis;
      an output gearwheel having a second rotational axis spaced apart radially from the first rotational axis;
      a connecting unit configured to transmit a rotational movement from the drive gearwheel to the output gearwheel substantially without a step-up transmission ratio, the connecting unit coupling the drive gearwheel and the output gearwheel in such a way that the drive gearwheel and the output gearwheel are pivotable relative to one another about a pivot axis; and
      a pivoting housing including (i) a first part fixed relative to the first rotational axis and defining a pivoting opening through which the second rotational axis extends and (ii) a second part extending around the second rotational axis, projecting through the pivoting opening, and configured to pivot about the pivot axis with the output gearwheel,
      wherein the second part includes an annular belt circumferentially surrounding the pivot axis and configured to at least partially close the pivoting opening.

12. The hand-held tool according to claim 11, further comprising a machine housing having an overall length of less than 180 mm.

13. The hand-held tool according to claim 11, further comprising:
    a tool housing,
    wherein the hand-held tool gear mechanism unit further comprises a coupling apparatus configured to produce a connection between the tool housing and the pivoting housing, the coupling apparatus being configured such that the connection is terminable in response to an operator action.

* * * * *